United States Patent [19]

Dalton

[11] 4,082,247
[45] Apr. 4, 1978

[54] VALVE ACTUATOR

[75] Inventor: Thomas B. Dalton, Muskegon, Mich.

[73] Assignee: Westran Corporation, Muskegon, Mich.

[21] Appl. No.: 652,530

[22] Filed: Jan. 26, 1976

[51] Int. Cl.² ............................................. F16k 31/53
[52] U.S. Cl. .................................. 251/229; 74/330; 74/424.8 VA; 251/248
[58] Field of Search ....... 74/329, 412, 330, 424.8 VA; 251/229, 248, 250.5

[56] References Cited

U.S. PATENT DOCUMENTS

| | | | |
|---|---|---|---|
| 1,705,032 | 3/1929 | Short | 74/330 |
| 2,317,529 | 4/1943 | Hodgson et al. | 74/424.8 VA |
| 3,034,371 | 5/1962 | Cantalupo et al. | 251/248 |
| 3,174,355 | 3/1965 | DeCraene | 74/424.8 VA |

Primary Examiner—William R. Cline
Assistant Examiner—G. L. Walton
Attorney, Agent, or Firm—Gifford, Chandler, Sheridan & Sprinkle

[57] ABSTRACT

A valve actuator is provided for use in conjunction with a valve having a rotatable member wherein rotation of the rotatable member selectively actuates the valve in accordance with the direction of rotation of the rotatable member. The valve may be of the rising-stem valve type in which the rotatable member threadably engages the valve stem to axially shift the valve stem to thereby actuate the valve. The valve actuator comprises a nut adapter secured to the rotatable member in combination with actuating means contained within a housing. The actuator means further comprises a drive tube which lockingly engages the nut adapter by means of inwardly projecting indentations formed axially along the drive tube and which are received in axial grooves formed along the periphery of the nut adapter. In addition, the drive tube is coaxial with the valve stem so as to permit the valve stem to be received axially through the drive tube upon valve actuation. The drive tube is rotatably mounted and a gear arrangement is contained with the housing to rotatably drive the drive tube.

2 Claims, 4 Drawing Figures

VALVE ACTUATOR

BACKGROUND OF THE INVENTION

I. Field of the Invention

The present invention relates generally to a value actuator, and more particularly, to a novel drive engagement between the valve actuator and a valve rotatable member.

II. Description of the Prior Art

There are a wide variety of different types of valve actuators used throughout industry, and likewise, a plurality of previously known valve actuators for each different type of valve. With the "rising stem" type of valve, which is commonly used as an oil pipeline valve or the like, a rotatable member threadably engages an elongated valve stem. The rotatable member is fixed against axial movement while, conversely, the stem is fixed against rotational movement so that rotation of the rotatable member axially moves the valve stem to thereby actuate the valve.

In order to actuate the so-called "rising stem" valves, it has been the previous practice to connect a handwheel, crank or the like to the rotatable member in order to effect rotation thereof. A handwheel or crank does not give sufficient mechanical advantage to be useful where large valves of high fluid pressures are involved. Also the valve stem in such assemblies is subjected to wear and tear from the natural elements and even to vandalism. Moreover, it has been found that attachment and removal of the actuating wheel tends to damage the valve stem as the handwheels bang against the valve stem due to carelessness of the workmen. Lastly, since the valve stem moves axially through the center of the handwheel, the valve stem itself tends to interfere with the natural cranking action of the workman.

In order to solve these difficulties, more complex valve actuators have been devised in which a gear arrangement is provided for drivingly engaging the rotatable member. A disadvantage of these previously known actuators, however, is that the actuators themselves are unnecessarily complex and require extensive tooling during their production which, of course, increases the cost of the actuator. In particular, many of the previously known valve actuators utilize an interdigital clutch mechanism between the actuator and the valve rotatable member for drivingly engaging the same. These previously known interdigital clutch assemblies are not only expensive to manufacture, but also are prone to failure.

Moreover, many of these previously known valve actuators require extensive modifications of the valve which is not only expensive but often time impractical, particularly when the valve is already installed in the field.

SUMMARY OF THE PRESENT INVENTION

The valve actuator of the present invention overcomes the abovementioned disadvantages of the previously known valve actuators by providing a valve actuator having a novel driving means between the actuator and the valve rotatable member. In brief, the driving engagement between the valve rotatable member and the actuator of the present invention comprises a nut adapter having a pair of diametrically opposed axial grooves formed on its periphery secured to the rotatable member in any conventional fashion. A drive tube is rotatably mounted within the actuator housing and includes a pair of diametrically opposed axially elongated and inwardly projecting indentations formed along its sides.

The drive tube is positioned coaxially over the valve stem and nut adapter so that the indentations are received within the grooves formed on the nut adapter. Consequently, rotation of the drive tube effects rotation of the nut adapter and likewise of the valve rotatable member.

A gear arrangement contained within the housing rotatably drives the drive tube upon rotation of an outwardly extending crankshaft to thereby actuate the valve. Any conventional means, such as a handwheel, may be secured to the crankshaft to effect the rotation thereof.

It can thus be seen that the driving engagement between the drive tube of the valve actuator of the present invention and the valve rotatable member provides a simple, inexpensive and yet totally effective driving engagement unlike the previously known valve actuators. Moreover, extensive modification to the valve is unnecessary with the valve actuator of the present invention.

BRIEF DESCRIPTION OF THE DRAWING

A better understanding of the valve actuator of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
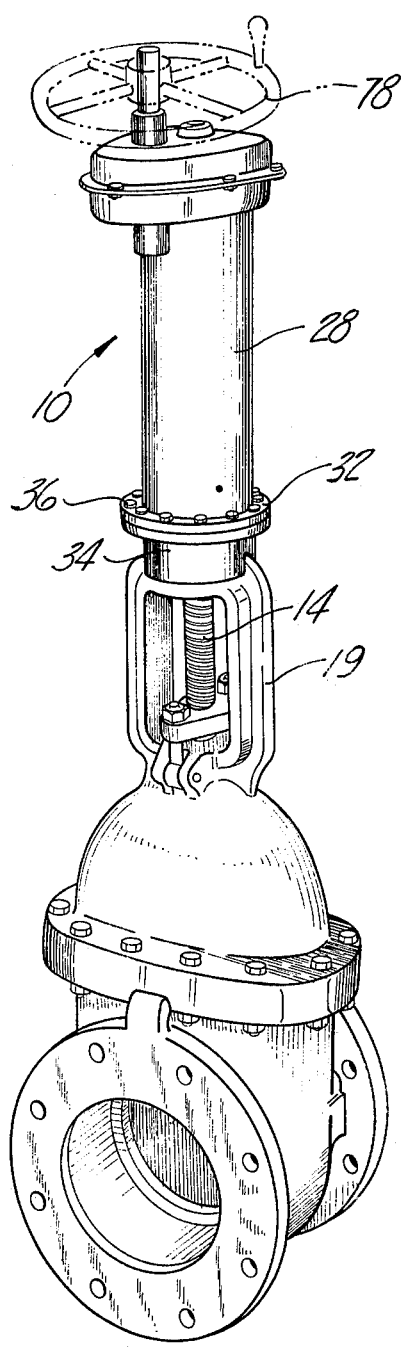
FIG. 1 is a perspective view showing the valve actuator of the present invention installed on a valve.
Figure 2:
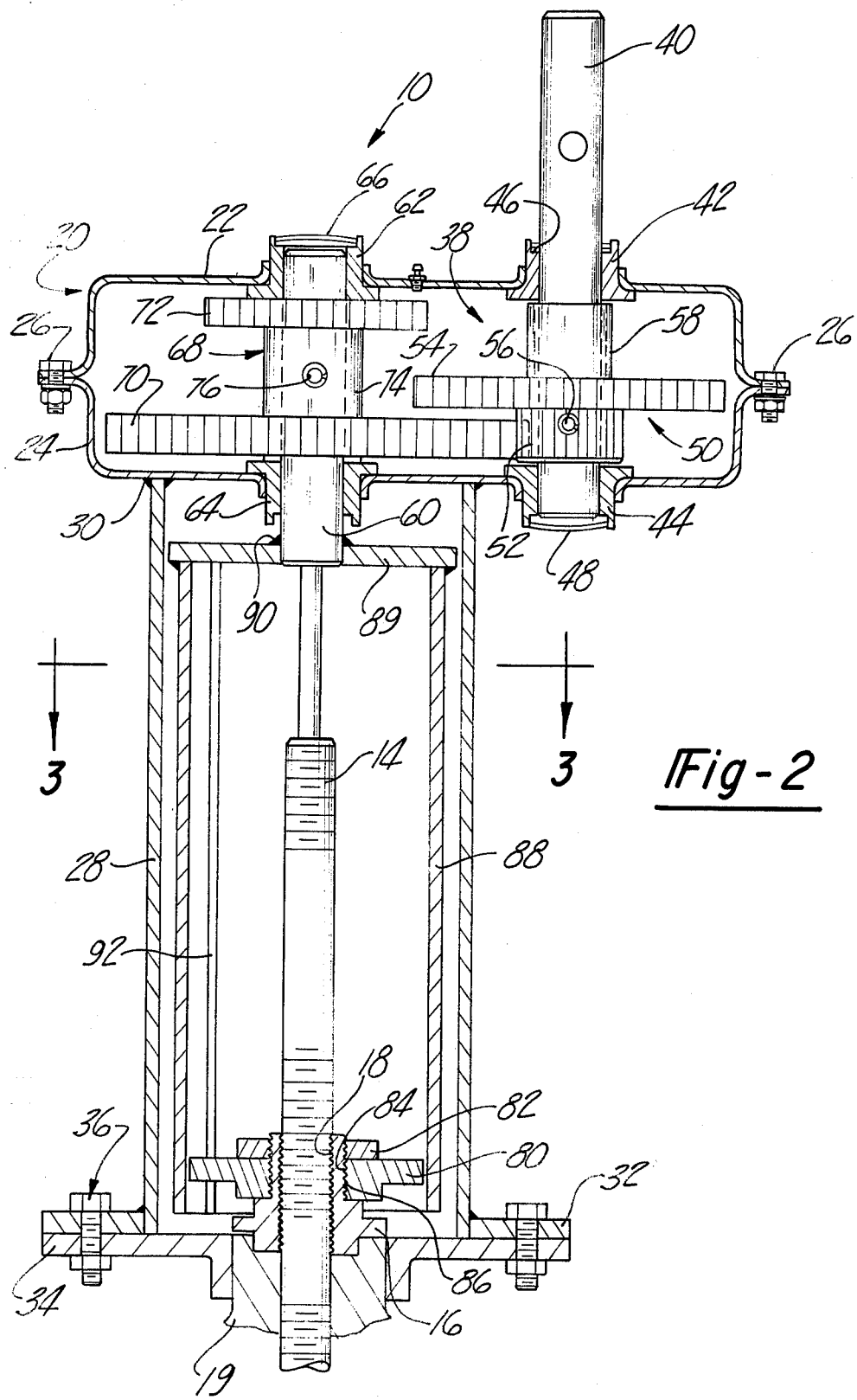
FIG. 2 is a cross-sectional view showing the valve actuator of the present invention.

Referring first to FIGS. 1 and 2, a preferred valve actuator assembly 10 is thereshown installed upon and adapted to actuate a valve 12. The valve 12, illustrated in FIG. 1 as a pipeline valve, is intended for purposes of illustration only and as will become shortly apparent, the actuator assembly 10 is readily adaptable to a wide variety of different kinds of valves 12. As shown, however, the valve 12 comprises an elongated valve stem 14 which is threadably received through a rotatable member 16 (FIG. 2) having internal threads 18. The rotatable member 16 is secured against axial movement by any conventional means to a yoke 19 and the valve stem 14 is secured against rotation by means (not shown) at its lower end. Consequently, rotation of the rotatable member 16 effects an axial displacement of the valve stem 14 which actuates the valve 12 in the conventional manner.

Referring now primarily to FIG. 2, the actuator assembly 10 comprises a housing 20 having an upper part 22 secured to a lower housing part 24 by nut and bolt members 26. A tubular cylindrical portion 28 is secured to the lower housing part 24 by welds 30 and at its lower end includes a radial flange 32. The flange 32 is rigidly secured to a yoke adapter 34 by nut and bolt members 36 and the yoke adapter 34 in turn is welded or otherwise secured to the yoke 19.

A gearing arrangement 38 is contained between the housing parts 22 and 24. In particular, a crankshaft 40 extends vertically through and exteriorly of the housing part 22 and is rotatably mounted by bearing means 42 and 44 in the upper and lower housing parts 22 and 24, respectively. In addition, appropriate sealing means 46 and a cap 48 are provided around the crankshaft 40 to prevent foreign debris from entering into the interior of the housing 20. The gearing arrangement 38 further comprises a double spur gear 50 having a reduced diameter gear wheel 52 and an enlarged diameter gear wheel 54 secured to the crankshaft 40 by a roll pin 56 or the like. A spacer sleeve 58 is positioned around the crankshaft 40 between the upper bearing 42 and the gear wheel 54 for a reason to become hereinafter apparent.

A drive shaft 60 is also rotatably mounted by bearing members 62 and 64 in the housing 20 so that the drive shaft 60 is spaced from the parallel to the crankshaft 40. As before, appropriate sealing means 66 are provided around the drive shaft 60 to prevent foreign debris from entering into the interior of the housing 20. A double spur gear 68 having a lower enlarged diameter gear wheel 70, an upper reduced diameter gear wheel 72 and a central sleeve portion 74 spaced between the gear wheels 72 and 70, is secured to the shaft 60 by a roll pin 76, or the like. The enlarged diameter gear wheel 70 is positioned within the housing 20 so that it meshes with the reduced diameter gear wheel 52 of the crankshaft spur gear 50. Consequently, rotation of the crankshaft 40 by any appropriate means, such as a handwheel 78 (FIG. 1) effects the opposite rotation of the drive shaft 60. It should also be apparent that by proper selection of the gear ratio between the gear wheel 52 and the gear wheel 70 prior to assembly of the valve actuator, and desired mechanical advantage between the crankshaft 40 and the drive shaft 60 may be achieved.

Figure 3:
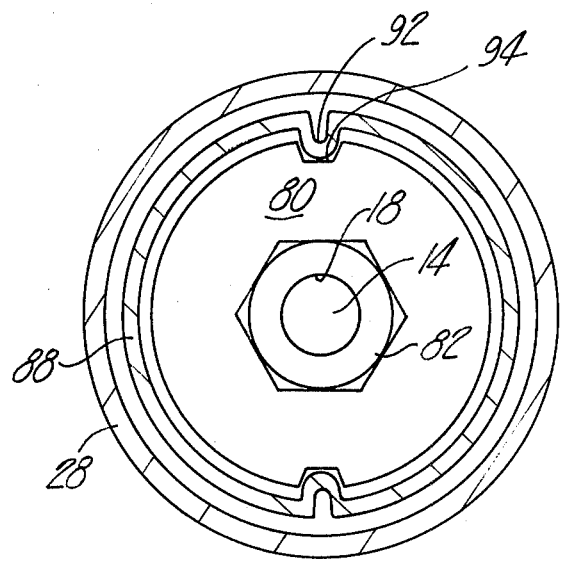
FIG. 3 is a cross-sectional view taken substantially along line 3—3 in FIG. 2 and enlarged somewhat for clarity.

With reference now particularly to FIGS. 2 and 3, the driving engagement between the drive shaft 60 and the valve rotatable member 16, which forms the novelty of the present invention, will now be described in detail. A disc shaped nut adapter 80 is disposed over and secured to the valve rotatable member 16 by a nut 82 which sandwiches the nut adapter 80 between the nut 82 and the valve rotatable member 16. In addition, the nut adapter 80 preferably includes internal threads 84 (FIG. 2) which threadably engage external threads 86 formed on the valve rotatable member 16 to securely attach the nut adapter 80 to the valve rotatable member 16. In this manner, rotation of the nut adapter 80 effects a like rotation of the valve rotatable member 16 which actuates the valve 12.

A generally cylindrical drive tube 88 includes an upper cap 89 secured to the drive shaft 60 by welds 90 or the like, so that the drive tube 88 is coaxial with both the tubular portion 28 and the nut adapter 80. A pair of diametrically opposed axial indentations 92 are formed along the periphery of the drive tube 88 so that the indentations 92 project inwardly as can best be seen in FIG. 3. The cross-sectional shape of the indentations 92 is such that the indentations 92 are received through a pair of diametrically opposed axially extending grooves 94 formed along the periphery of the nut adapter 80. Also as is best seen in FIG. 3, the diameter of the nut adapter 80 is substantially the same as the inside diameter of the drive tube 88 so that the nut adapter 80 snugly fits within the drive tube 88. Thus rotation of the drive tube 88 effects a like rotation of the valve rotatable member 16 by way of the nut adapter 80.

Although it should be apparent, rotation of the crankshaft 40 causes the drive tube 88 to rotate via the meshing gears 52 and 70. Likewise, rotation of the drive tube 88 actuates the valve 12 via the nut adapter 80.

It can thus be seen that the drive tube in conjunction with the nut adapter provides a novel and yet simple driving engagement between the gearing arrangement and the valve rotatable member 16. The gearing arrangement, of course, provides a mechanical advantage while permitting the valve 12 to be opened or closed despite its size and whether or not high fluid pressures are encountered. This driving engagement is not only effective in use, but also relatively simple and inexpensive in construction. Moreover, the interior of the drive tube 88 forms a passage for receiving the valve stem 14 therein and protecting the valve stem 14 against not only the natural elements but also from damage from vandalism.

Figure 4:
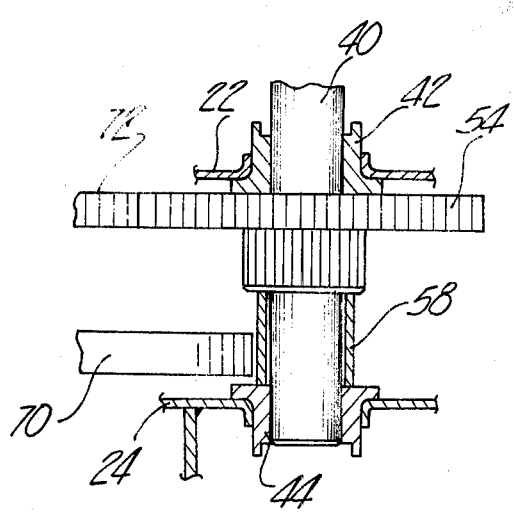
FIG. 4 is a fragmentary cross-sectional view similar to portions shown in FIG. 2 but showing a modification thereof.

A modification to the present invention is shown in FIG. 4. By repositioning the spacer sleeve 58 around the crankshaft 40 between the lower bearing 44 and the reduced diameter gear wheel 52, the enlarged diameter gear wheel 54 is then axially positioned to mesh with the reduced diameter gear wheel 72 on the drive shaft 60 since the sleeves 58 and 74 are of the same axial length. This modification thus permits a choice of not only the mechanical advantage obtained between the crankshaft 40 and the drive shaft 60 but also a choice as to the rotational speed of the drive tube 88 with a given rotational speed of the crankshaft 40.

It will be understood, of course, that in order to interchange the position of the double spur gear 50 with the spacer sleeve 58, the housing 20 must be disassembled and the roll pin 56 removed and repositioned in the shaft 40.

It is to be understood that although the valve actuator of the present invention has been described for use in conjunction with a rising stem valve, the valve actuator may be used with any valve having a rotatable member. Likewise, having described our invention many modifications thereto will become apparent to those skilled in the art to which it pertains without deviation from the spirit of the invention as defined by the scope of the appended claims.

What is claimed is:

1. A valve actuator for use in conjunction with a valve having a rotatable member, the rotation of which actuates the valve, said actuator comprising:

a drive tube disposed coaxially with and over said rotatable member, means for drivingly connecting said drive tube and said rotatable member, said means comprising an adapter, means for securing said adapter to said rotatable member whereby rotation of said adapter produces rotation of said rotatable member, at least one inwardly projecting, axially inwardly extending projection formed along said drive tube, said adapter having an axially extending groove receiving said projection whereby rotation of said drive tube produces rotation of said adapter and said rotatable member, and means for rotatably driving said drive tube, said means comprising a rotatably mounted drive shaft secured to said drive tube, a vertical rotatably mounted crankshaft spaced from and parallel to said drive shaft and a gearing arrangement disposed between said crankshaft and said drive shaft whereby rotation of said crankshaft effects an opposite rotation of said drive shaft, said gear arrangement comprising first and second gear wheels secured to said crankshaft, said first and second gear wheels having different diameters, and third and fourth gear wheels secured to said drive shaft, said third and fourth gear wheels having different diameters, said first and third gears being in mesh when said first and second gear wheels are in one axial position on said crankshaft and said second and fourth gears being in mesh when said first and second gear wheels are in another axial position on said crankshaft, means for fixedly attaching said first and second gears to said crankshaft in either of said axial positions whereby a first and second gear ratio of said gear arrangement is obtained when said first and second gears are respectively in said first and second axial positions on said crankshaft.

2. The valve actuator as defined in claim 1, and including a housing and a cylindrical tubular portion secured to said housing, said portion being disposed around and coaxially with said drive tube, and means for securing said portion.

* * * * *